US009948650B2

(12) United States Patent
Fox et al.

(10) Patent No.: US 9,948,650 B2
(45) Date of Patent: Apr. 17, 2018

(54) SEARCH ENGINE WITH PRIVACY PROTECTION

(71) Applicant: International Business Machines Corporation, Armonk, NY (US)

(72) Inventors: Joshua Fox, Haela (IL); Michael Pelts, Tzur Hadassah (IL); Eitan Shapiro, Hafia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/842,731

(22) Filed: Sep. 1, 2015

(65) Prior Publication Data

US 2016/0028732 A1   Jan. 28, 2016

Related U.S. Application Data

(62) Division of application No. 12/559,720, filed on Sep. 15, 2009, now Pat. No. 9,224,007.

(51) Int. Cl.
*G06F 17/30* (2006.01)
*H04L 29/06* (2006.01)
(Continued)

(52) U.S. Cl.
CPC ........ *H04L 63/10* (2013.01); *G06F 17/30321* (2013.01); *G06F 17/30477* (2013.01);
(Continued)

(58) Field of Classification Search
CPC ..................... G06F 17/30867; G06F 17/30991
(Continued)

(56) References Cited

U.S. PATENT DOCUMENTS 5,619,648 A   4/1997   Canale et al.
5,664,109 A   9/1997   Johnson et al.
(Continued)

FOREIGN PATENT DOCUMENTS

EP   1077421 A2   2/2001
EP   1638032      3/2006
(Continued)

OTHER PUBLICATIONS

Preliminary Remarks, dated Oct. 2, 2009, for U.S. Appl. No. 12/548,123, filed Aug. 26, 2009, entitled "Method for Detecting End Point of Plasma Etching and Plasma Etching Apparatus", invented by Joshua Fox et al., Total 3 pgs.
(Continued)

*Primary Examiner* — Joshua Bullock
(74) *Attorney, Agent, or Firm* — David W. Victor; Konrad, Raynes, Davada and Victor LLP

(57) ABSTRACT

A search engine system with privacy protection, including a data indexer configured to create an index of data, a search engine configured to search the index of the data in response to a query, and create a search result set including excerpts from the data, and a privacy protector configured to identify at least one data entity within at least one excerpt of the search result set that meets at least one predefined entity extraction criterion, redact the search result set by removing the data entity from the excerpt, and present the redacted search result set on a computer output device.

3 Claims, 10 Drawing Sheets

(51) Int. Cl.
    *G06F 21/62* (2013.01)
    *G06F 21/84* (2013.01)
(52) U.S. Cl.
    CPC .. *G06F 17/30554* (2013.01); *G06F 17/30867* (2013.01); *G06F 17/30991* (2013.01); *G06F 21/62* (2013.01); *G06F 21/6245* (2013.01); *G06F 21/84* (2013.01)
(58) Field of Classification Search
    USPC ................................................ 707/706, 741
    See application file for complete search history.

(56) References Cited

U.S. PATENT DOCUMENTS

| | | |
|---|---|---|
| 5,940,843 A | 8/1999 | Zucknovich et al. |
| 5,960,080 A | 9/1999 | Fahlman et al. |
| 6,052,682 A | 4/2000 | Miller et al. |
| 6,115,704 A | 9/2000 | Olson et al. |
| 6,161,084 A | 12/2000 | Messerly et al. |
| 6,178,439 B1 | 1/2001 | Feit |
| 6,226,635 B1 | 5/2001 | Katariya |
| 6,330,610 B1 | 12/2001 | Docter et al. |
| 6,336,117 B1 | 1/2002 | Massarani |
| 6,453,327 B1 | 9/2002 | Nielsen |
| 6,539,371 B1 | 3/2003 | Bleizelfer et al. |
| 6,640,010 B2 | 10/2003 | Seeger et al. |
| 6,820,082 B1 | 11/2004 | Cook et al. |
| 6,820,237 B1 | 11/2004 | Abu-Hakima et al. |
| 6,879,977 B2 | 4/2005 | Huffman et al. |
| 6,928,618 B2 | 8/2005 | Kohls et al. |
| 6,931,403 B1 | 8/2005 | Agrawal |
| 6,952,720 B2 | 10/2005 | Guedalia et al. |
| 7,028,049 B1 | 4/2006 | Shelton |
| 7,181,495 B2 | 2/2007 | Skladman et al. |
| 7,194,693 B2 | 3/2007 | Cragun et al. |
| 7,206,814 B2 | 4/2007 | Kirsch |
| 7,243,097 B1 | 7/2007 | Agrawal et al. |
| 7,293,017 B2 | 11/2007 | Hurst-Hiller et al. |
| 7,316,032 B2 | 1/2008 | Tayebi et al. |
| 7,412,605 B2 | 8/2008 | Raley |
| 7,505,673 B2 | 3/2009 | Kreiner et al. |
| 7,523,135 B2 | 4/2009 | Bradford et al. |
| 7,660,798 B1 | 2/2010 | Ludwig et al. |
| 7,730,010 B2 | 6/2010 | Kishore et al. |
| 7,748,027 B2 | 6/2010 | Patrick |
| 7,752,566 B1 | 7/2010 | Nelson |
| 7,802,305 B1 | 9/2010 | Leeds |
| 7,873,838 B2 | 1/2011 | Staddon et al. |
| 9,195,853 B2 | 11/2015 | Fox et al. |
| 9,224,007 B2 | 12/2015 | Fox et al. |
| 2002/0165021 A1 | 11/2002 | Several et al. |
| 2004/0054918 A1 | 3/2004 | Duri et al. |
| 2004/0061716 A1 | 4/2004 | Cheung et al. |
| 2004/0073461 A1 | 4/2004 | Pappas |
| 2004/0139043 A1 | 7/2004 | Lei et al. |
| 2004/0240735 A1 | 12/2004 | Medina |
| 2005/0140572 A1 | 6/2005 | Kahan et al. |
| 2005/0283471 A1 | 12/2005 | Ahmed |
| 2006/0026159 A1* | 2/2006 | Dettinger ............ G06F 21/6227 |
| 2006/0031301 A1 | 2/2006 | Herz et al. |
| 2006/0053097 A1 | 3/2006 | King |
| 2006/0136985 A1 | 6/2006 | Ashley et al. |
| 2006/0156222 A1 | 7/2006 | Chi et al. |
| 2006/0259954 A1 | 11/2006 | Patrick |
| 2006/0259977 A1 | 11/2006 | Patrick |
| 2007/0030528 A1 | 2/2007 | Quaeler et al. |
| 2007/0094284 A1 | 4/2007 | Bradford et al. |
| 2007/0094594 A1 | 4/2007 | Matichuk et al. |
| 2007/0118534 A1 | 5/2007 | Hayes et al. |
| 2007/0192122 A1 | 8/2007 | Routson et al. |
| 2007/0192734 A1 | 8/2007 | Berstis et al. |
| 2007/0203776 A1 | 8/2007 | Austin et al. |
| 2007/0239653 A1 | 10/2007 | Kiehn |
| 2007/0255704 A1 | 11/2007 | Baek et al. |
| 2007/0266079 A1 | 11/2007 | Criddle et al. |
| 2007/0271212 A1* | 11/2007 | Jones ............... G06F 17/30867 |
| 2007/0274478 A1 | 11/2007 | Crawford, III |
| 2007/0276649 A1 | 11/2007 | Schubert |
| 2008/0016341 A1 | 1/2008 | Staddon et al. |
| 2008/0016372 A1 | 1/2008 | Staddon et al. |
| 2008/0046757 A1 | 2/2008 | Staddon et al. |
| 2008/0052759 A1 | 2/2008 | Kronlund et al. |
| 2008/0072290 A1* | 3/2008 | Metzer ............. G06F 17/30348 726/3 |
| 2008/0204788 A1 | 8/2008 | Kelly et al. |
| 2008/0250021 A1 | 10/2008 | Boys et al. |
| 2008/0320604 A1 | 12/2008 | Nakajima et al. |
| 2009/0037222 A1* | 2/2009 | Kuo .................... G06F 19/321 705/3 |
| 2009/0089663 A1 | 4/2009 | Rebstock et al. |
| 2009/0094675 A1 | 4/2009 | Powers et al. |
| 2009/0132419 A1 | 5/2009 | Grammer et al. |
| 2009/0164878 A1 | 6/2009 | Cottrille |
| 2009/0164881 A1 | 6/2009 | Segarra et al. |
| 2009/0192941 A1* | 7/2009 | Fournier ............ G06F 19/322 705/51 |
| 2009/0198697 A1 | 8/2009 | Bilger et al. |
| 2009/0265316 A1 | 10/2009 | Poulin et al. |
| 2009/0276701 A1 | 11/2009 | Nurmi |
| 2009/0296166 A1 | 12/2009 | Schrichte |
| 2009/0299853 A1* | 12/2009 | Jones ..................... G06Q 30/02 705/14.46 |
| 2009/0323087 A1 | 12/2009 | Luo |
| 2010/0010912 A1* | 1/2010 | Jones ................ G06Q 30/0601 705/26.1 |
| 2010/0046015 A1 | 2/2010 | Whittle et al. |
| 2010/0070396 A1 | 3/2010 | Schrichte |
| 2010/0082652 A1* | 4/2010 | Jones ..................... G06Q 30/02 707/758 |
| 2010/0229246 A1 | 9/2010 | Warrington et al. |
| 2010/0241844 A1 | 9/2010 | Hussain et al. |
| 2011/0055932 A1 | 3/2011 | Fox et al. |
| 2011/0066606 A1 | 3/2011 | Fox et al. |
| 2011/0119361 A1 | 5/2011 | Issa et al. |
| 2011/0119576 A1 | 5/2011 | Aumann |
| 2011/0162084 A1 | 6/2011 | Fox et al. |
| 2011/0179352 A1 | 7/2011 | Treadwell et al. |
| 2011/0239113 A1 | 9/2011 | Hung et al. |
| 2011/0247081 A1 | 10/2011 | Shelton |
| 2012/0159296 A1* | 6/2012 | Rebstock ............... G06Q 10/00 715/205 |
| 2012/0192066 A1 | 7/2012 | Fox et al. |
| 2012/0239380 A1 | 9/2012 | Cumby et al. |
| 2012/0304304 A1 | 11/2012 | Avrahami et al. |
| 2013/0117802 A1* | 5/2013 | Fendt .................. G06F 21/6218 726/1 |
| 2013/0144901 A1 | 6/2013 | Ho et al. |
| 2013/0151346 A1 | 6/2013 | Schoen |
| 2013/0185634 A1 | 7/2013 | Fox et al. |
| 2014/0129936 A1* | 5/2014 | Richards ............. G06F 21/6218 715/716 |
| 2014/0136941 A1 | 5/2014 | Avrahami et al. |
| 2014/0317758 A1 | 10/2014 | Avrahami et al. |

FOREIGN PATENT DOCUMENTS

| | | |
|---|---|---|
| EP | 1818807 | 8/2007 |
| EP | 2375353 | 10/2011 |
| JP | 2004252773 | 9/2004 |
| WO | 2006041318 A1 | 4/2006 |
| WO | 2006104810 | 10/2006 |
| WO | 2006104810 A3 | 10/2006 |
| WO | 2007044970 | 4/2007 |
| WO | 2008005017 | 1/2008 |
| WO | 2008122825 | 10/2008 |

OTHER PUBLICATIONS

Office Action, dated May 8, 2012, for U.S. Appl. No. 12/548,123, filed Aug. 26, 2009, entitled "Method for Detecting End Point of

(56) References Cited

OTHER PUBLICATIONS

Plasma Etching and Plasma Etching Apparatus", invented by Joshua Fox et al., Total 19 pgs.
Response to Office Action, dated Oct. 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Supplemental Amendment, dated Oct. 30, 2012, for U.S. Appl. No. 12/548,123, filed Aug. 26, 2009, entitled "Method for Detecting End Point of Plasma Etching and Plasma Etching Apparatus", invented by Joshua Fox et al., Total 6 pgs.
Final Office Action, dated Jul. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Response to Final Office Action, dated Nov. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 11 pages.
Office Action, dated Dec. 20, 2013, for U.S. Appl. No. 12/548,123, filed Aug. 26, 2009, entitled "Method for Detecting End Point of Plasma Etching and Plasma Etching Apparatus", invented by Joshua Fox et al., Total 13 pages.
Response to Office Action, dated Apr. 4, 2014, for U.S. Appl. No. 12/548,123, filed Aug. 26, 2009, entitled "Method for Detecting End Point of Plasma Etching and Plasma Etching Apparatus", invented by Joshua Fox et al., Total 4 pages.
Preliminary Amendment, dated Mar. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 6 pages.
Office Action, dated Sep. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 19 pages.
Response to Office Action, dated Feb. 1, 2013, for U.S. Appl. No. 12/648,413, filed Dec. 29, 2009,entitled, "Selecting Portions of Computer-Accessible Documents for Post-Selection Processing", invented by Joshua Fox et al., Total 12 pages.
Final Office Action, dated Aug. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 34 pages.
Response to Final Office Action, dated Nov. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 15 pages.
Office Action, dated Dec. 5, 2013, for U.S. Appl. No. 12/648,413, filed Dec. 29, 2009,entitled, "Selecting Portions of Computer-Accessible Documents for Post-Selection Processing", invented by Joshua Fox et al., Total 37 pages.
Response to Office Action, dated Apr. 4, 2014, for U.S. Appl. No. 12/648,413, filed Dec. 29, 2009,entitled, "Selecting Portions of Computer-Accessible Documents for Post-Selection Processing", invented by Joshua Fox et al., Total 14 pages.
Preliminary Amendment, dated Mar. 27, 2012, for U.S. Appl. No. 13/431,032, filed Mar. 27, 2012, entitled, "Selecting Portions of Computer-Accessible Documents for Post-Selection Processing", invented by Joshua Fox et al., Total 6 pages.
Office Action, dated Jul. 2, 2014, for U.S. Appl. No. 13/431,032, filed Mar. 27, 2012, entitled, "Selecting Portions of Computer-Accessible Documents for Post-Selection Processing", invented by Joshua Fox et al., Total 19 pages.
Office Action, dated Mar. 7, 2014. for U.S. Appl. No. 13/350,794, filed Jan. 15, 2012, entitled, "Automated Document Redaction", invented by Joshua Fox et al., Total 36 pgs.
Bier, E. et al., "The Rules of Redaction: Identity, Protect, Review (and Repeat)", dated Nov./Dec. 2009, Palo Alto Research Center, Total 1 page.

Damiani et al. A Fine-Grained Access Control System for XML Documents, dated May 2002, ACM transactions on Information and System Security, vol. 6, pp. 169-202, document No. XP0026245587.
Deguillaume, F. et al., "Protocols for Data-Hiding Based Text Document Security and Automatic Processing", Downloaded on Sep. 22, 2009 from IEEE Xplore, Computer Science Department, CUI—University of Geneva, Total 12 pages.
"Document Technology Systems Redaction Overview", Document Technology Systems, dated Apr. 28, 2006, (online) retrieved from the Internet at URL>http:www.dts-doc.com, Total 2 pages.
"Intellidact Intelligent Redaction Software", dated 2008, Computing Systems Innovations Inc., Total 2 pages.
Taghva, K., et al., "Identification and Redaction of Privacy Information in Scanned Documents", dated 2008, Information Science Research, Institute University of Nevada, Las Vegas, The 5th International Conference on Information Technology Applications, Total 8 pages.
Porat, S. et al, "Masking Gateway for Enterprises", dated 2009, IBM Haifa Research Lab, Total 15 pages.
"Redact-It Overview", (online), downloaded on Feb. 10, 2012 from URL>http://www.redact.com/overview, Total 3 pages.
Stolfo et al., "PARULEL: Parallel Rule Processing Using Meta-Rules for Redaction", dated Jun. 25, 1991, Department of Computer Science, Columbia University, New York, NY, Total 47 pages.
"Turn Desktop Alerts On or Off" (online) Microsoft Office Support, Outlook 2007, downloaded Apr. 26, 2012 at URL>http:office.microsoft.com/en-us/outlook-help/turn-desktop-alerts-on-or-offHA010098670.aspx, Total 4 pages.
US Department of Energy Office of Science, The Office of Science Graduate Fellowship Program, "Resourses of Handling Transcripts", downloaded Sep. 30, 2012, http://scgf.orau.gov/transcripts-resources.html, Total 3 pages.
Wong, A. et al , "Expert Knowledge Based Automatic Regions-of-Interst (ROU) Selection in Scanned Documents for Digital Image Encryption", dated 2006, Department of Electrical and Computer Engineering University of Waterloo, Ontario, Canada, Total 8 pages.
ZyLAB, "Use Intelligent Redaction Tools to Secure Your Data", retrieved from the Internet on Sep. 24, 2012 at URL>http:www.zylab.com/Solutions/Redact/Secure.aspx, Total 2 pages.
US Patent Application, dated Mar. 26, 2014, for U.S. Appl. No. 14/228,246, filed Mar. 26, 2014, entitled "Focused Personal Identifying Information Redaction", invented by Joshua Fox et al, Total 27 pages.
Final Office Action, dated Jul. 16, 2014, for U.S. Appl. No. 12/548,123, filed Aug. 26, 2009, entitled "Method for Detecting End Point of Plasma Etching and Plasma Etching Apparatus", invented by Joshua Fox et al., Total 14 pages.
Final Office Action, dated Sep. 2, 2015, for U.S. Appl. No. 12/548,123, filed Aug. 26, 1919, invented by Joshua Fox, Total 14 pages.
Response to Final Office Action, dated Sep. 10, 2015, for U.S. Appl. No. 13/676,712, filed Nov. 14, 2012, invented by S. Avrahami et al., Total 9 pages.
Response to Final Office Action, dated Oct. 13, 2015, for U.S. Appl. No. 13/676,712, filed Nov. 14, 2012, invented by S. Avrahami et al., Total 10 pages.
International Search Report and Written Opinion, dated May 3, 2013, for International Application No. PCT/IB2013/050355, filed Jan. 15, 2013,Total 9 pages.
International Preliminary Report on Patentability, dated Mar. 20, 2012, for International Application No. PCT/EP2010/062729, filed Aug. 31, 2010, Total 12 pages.
International Search Report, dated Mar. 24, 2011, for International Application No. PCT/EP2010/062729, filed Aug. 31, 2010, Total 6 pages.
Written Opinion of the International Searching Authority, dated Mar. 15, 2012, for International Application No. PCT/EP2010/062729, filed Aug. 31, 2010, Total 11 pages.
International Preliminary Report on Patentability, dated Jul. 15, 2014, for International Application No. PCT/IB2013/050355, filed Jan. 15, 2013, Total 5 pages.

(56) References Cited

OTHER PUBLICATIONS

Response to Final Office Action, dated Oct. 16, 2014, for U.S. Appl. No. 12/548,123, filed Aug. 26, 2009, invented by Joshua Fox et al., Total 11 pages.
Final Office Action, dated Nov. 7, 2014, for U.S. Appl. No. 12/548,123, filed Aug. 26, 2009, invented by Joshua Fox, Total 24 pages.
Response to Final Office Action, dated Jan. 27, 2015, for U.S. Appl. No. 12/548,123, filed Aug. 26, 2009, invented by Joshua Fox, Total 10 pages.
Office Action 6, dated Mar. 26, 2015, for U.S. Appl. No. 12/548,123, filed Aug. 26, 2009 by J. Fox et al., Total 15 pp.
Response to Office Action, dated Jun. 22, 2015, for U.S. Appl. No. 12/548,123, filed May 26, 2009, invented by Joshua Fox, Total 7 pages.
Office Action, dated Jan. 28, 2015, for U.S. Appl. No. 13/676,712, filed Nov. 14, 2012, invented by Joshua Fox, Total 31 pages.
Response to Office Action, dated Apr. 28, 2015, for U.S. Appl. No. 13/676,712, filed Nov. 14, 2012, invented by Joshua Fox, Total 9 pages.
Final Office Action, dated Jun. 10, 2015, for U.S. Appl. No. 13/676,712, filed Nov. 14, 2012 by S. Avrahami et al., Total 25 pages.
Office Action, dated Mar. 1, 2012, for U.S. Appl. No. 12/559,720, filed Sep. 15, 2009, entitled, "Search Engine With Privacy Protection", invented by invented by Joshua Fox et. al, Total 32 pgs.
Resp. to OA1—for U.S. Appl. No. 12/559,720, dated May 9, 2012, 8 pgs.
Supplemental Amendment, dated Jun. 1, 2012, for U.S. Appl. No. 12/559,720, filed Sep. 15, 2009, invented by invented by Joshua Fox et. al, total 19 pgs.
Final Office Action, dated Aug. 27, 2012, for U.S. Appl. No. 12/559,720, filed Sep. 15, 2009, invented by invented by Joshua Fox et. al, Total 34 pgs.
Response to Final Office Action, dated Dec. 27, 2012, for U.S. Appl. No. 12/559,720, filed Sep. 15, 2009, invented by invented by Joshua Fox et. al, Total 21 pgs.
Restriction Requirement, dated Mar. 7, 2014, for U.S. Appl. No. 12/559,720, filed Sep. 15, 2009, invented by Joshua Fox, Total 6 pages.
Response to Restriction Requirement, dated May 8, 2014, for U.S. Appl. No. 12/559,720, filed Sep. 15, 2009, invented by Joshua Fox, Total 10 pages.
Notice of Allowance, dated Jun. 20, 2014, for U.S. Appl. No. 12/559,720, Sep. 15, 2009, invented by Joshua Fox et al., Total 15 pages.
Supplemental Amendment, dated Sep. 25, 2014, for U.S. Appl. No. 12/559,720, filed Sep. 15, 2009, invented by Joshua Fox, Total 7 pages.
Notice of Allowance, dated Oct. 14, 2014, for U.S. Appl. No. 12/559,720, filed Sep. 15, 2009, invented by Joshua Fox et al., Total 8 pages.
Supplemental Amendment, dated Oct. 14, 2014, for U.S. Appl. No. 12/559,720, filed Sep. 15, 2009, invented by Joshua Fox, Total 1 page.
Notice of Allowance, dated Jan. 30, 2015 , for U.S. Appl. No. 12/559,720, filed Sep. 15, 2009, invented by Joshua Fox, Total 10 pages.
Notice of Allowance, dated Jun. 19, 2015, for U.S. Appl. No. 12/559,720, filed Sep. 15, 2009, invented by Joshua Fox, Total 13 pages.
Final Office Action, dated Aug. 28, 2014, for U.S. Appl. No. 12/648,413, filed Dec. 29, 2009, invented by Joshua Fox et al., Total 36 pages.
Response to Final Office Action, dated Dec. 23, 2014, for U.S. Appl. No. 12/648,413, filed Dec. 29, 2009, invented by Joshua Fox, Total 12 pages.
Office Action 3, dated Apr. 10, 2015, for U.S. Appl. No. 12/648,413, filed Dec. 29, 2009, invented by Joshua Fox, Total 45 pages.
Response to Office Action, dated Jul. 10, 2015, for U.S. Appl. No. 12/648,413, filed Dec. 29, 2009, invented by Joshua Fox, Total 14 pages.
Response to Office Action, dated Oct. 2, 2014, for U.S. Appl. No. 13/431,032, filed Mar. 27, 2012, invented by Joshua Fox et al., Total 7 pages.
Final Office Action, dated Feb. 5, 2015, for U.S. Appl. No. 13/431,032, filed Mar. 27, 2012, invented by Joshua Fox, Total 20 pages.
Response to Final Office Action, dated Apr. 28, 2015, for U.S. Appl. No. 13/431,032, filed Mar. 27, 2012, invented by Joshua Fox, Total 9 pages.
Office Action, dated Jul. 22, 2015, dated Apr. 28, 2015, for U.S. Appl. No. 13/431,032, filed Mar. 27, 2012, invented by Joshua Fox, Total 30 pages.
Response to Office Action, dated Jun. 9, 2014, for U.S. Appl. No. 13/350,794, filed Jan. 15, 2012, invented by Joshua Fox et al., Total 13 pgs.
Final Office Action, dated Dec. 19, 2014, for U.S. Appl. No. 13/350,794, filed Jan. 15, 2012, invented by Joshua Fox et al., Total 36 pages.
Response to Final Office Action, dated Mar. 19, 2015, for U.S. Appl. No. 13/350,794, filed Jan. 15, 2012, invented by Joshua Fox et al., Total 12 pages.
Notice of Allowance, dated Apr. 8, 2015, for U.S. Appl. No. 13/350,794, filed Jan. 15, 2012, invented by Joshua Fox et al., Total 13 pages.
Notice of Allowance, dated Jul. 20, 2015, for U.S. Appl. No. 13/350,794, filed Jan. 15, 2012, invented by Joshua Fox et al., Total 14 pages.
C. Cumby et al., "A Machine Learning Based System for Semi-Automatically Redacting Documents", dated 2011, Proceedings of the Twenty-Third Innovative Applications of Artificial Intelligence Conference, Total 8 pages.
Google Hacking, Wikipedia the Free Encyclopedia, (retrieved Jun. 16, 2010), http://en.wikipedia.org/wiki/Google_hacking.
IBM "InfoSphere Guardian Data Redaction" Solution Brief, IBM Software, dated Jul. 2012, Total 6 pages.
IBM "Privacy for Instant-Message for Email Popups" IP.Com, dated Mar. 16, 2009, https://priorart.ip.com/download/IPCOM000180738D/IPCOM000180738D.pdf.
Rogers, G "Googling Google: Google Gives Malware the Finger," ZDNet, CBS Interactive, Inc., Aug. 4, 2006, (retrieved Jun. 16, 2010), http://www.zdnet.com/blog/google/google-gives-malware-the-finger/283.
Office Action, dated Feb. 4, 2016, for U.S. Appl. No. 12/548,123, filed Aug. 26, 2009, invented by Joshua Fox, Total 14 pages.
Office Action, dated Dec. 16, 2015, for U.S. Appl. No. 13/676,712, filed Nov. 14, 2012, invented by S. Avrahami et al., Total 21 pages.
Final Office Action, dated Feb. 3, 2016, for U.S. Appl. No. 13/431,032, filed Mar. 27, 2012, invented by Joshua Fox et al., Total 12 pages.
Response to Final Office Action, dated Dec. 2, 2015, for U.S. Appl. No. 12/548,123, filed Aug. 26, 2009, invented by Joshua Fox, Total 7 pages.
Final Office Action, dated Nov. 20, 2015, for U.S. Appl. No. 12/648,413, filed Dec. 29, 2009, invented by Joshua Fox, Total 49 pages.
Notice of Appeal, dated Feb. 19, 2016, for U.S. Appl. No. 12/648,413, filed Dec. 29, 2009, invented by Joshua Fox, Total 2 pages.
Pre-Appeal Brief Request for Review, dated Feb. 19, 2016, for U.S. Appl. No. 12/648,413, filed Dec. 29, 2009, invented by Joshua Fox, Total 6 pages.
Notice of Allowance, dated Mar. 29, 2016, for U.S. Appl. No. 12/648,413, filed Dec. 29, 2009, invented by Joshua Fox, Total 10 pages.
Response to Office Action, dated May 4, 2016, for U.S. Appl. No. 12/548,123, filed Aug. 26, 2009, invented by Joshua Fox, Total pages.
Response to Office Action, dated May 12, 2016, for U.S. Appl. No. 12/548,123, filed Aug. 26, 2009, invented by Joshua Fox, Total 6 pages.

(56) References Cited

OTHER PUBLICATIONS

Response to Office Action, dated Mar. 16, 2016, for U.S. Appl. No. 13/676,712, filed Nov. 14, 2012, invented by Joshua Fox, Total 11 pages.
Final Office Action, dated May 11, 2016, for U.S. Appl. No. 13/676,712, filed Nov. 14, 2012, invented by Joshua Fox, Total 21 pages.
Response after Final Office Action, dated Jan. 20, 2016 for U.S. Appl. No. 12/648,413, filed Dec. 29, 2009, invented by Joshua Fox, Total 14 pages.
Response to Final Office Action, dated May 3, 2016, for U.S. Appl. No. 13/431,032, filed Mar. 27, 2012, invented by Joshua Fox et al., Total 9 pages.
Notice of Allowance, dated Jun. 15, 2016, for U.S. Appl. No. 13/431,032, filed Mar. 27, 2012, invented by Joshua Fox et al., Total 9 pages.
Response to Final Office Action, dated Nov. 11, 2016, for U.S. Appl. No. 12/548,123, filed Aug. 26, 2009, invented by Joshua Fox et. al, Total 9 pgs.
Office Action dated Oct. 6, 2016, for U.S. Appl. No. 13/676,712, filed Nov. 14, 2012, invented by S. Avrahami et al., Total 12 pages.
Notice of Allowance, dated Nov. 16, 2016, for U.S. Appl. No. 12/648,413, filed Dec. 29, 2009, invented by Joshua Fox, Total 27 pages.
Notice of Allowance, dated Nov. 2, 2016, for U.S. Appl. No. 13/431,032, filed Mar. 27, 2012, invented by Joshua Fox et al., Total 23 pages.
Final Office Action, dated Aug. 12, 2016, for U.S. Appl. No. 12/548,123, filed Aug. 26, 2009, invented by Joshua Fox, Total 16 pages.
Response to Final Office Action, dated Aug. 11, 2016, for U.S. Appl. No. 13/676,712, filed Nov. 14, 2012, invented by Joshua Fox, Total 11 pages.
Supplemental Amendment, dated Jun. 28, 2016, for U.S. Appl. No. 12/648,413, filed Dec. 29, 2009, invented by Joshua Fox, Total 7 pages.
Office Action, dated Dec. 29, 2016, for U.S. Appl. No. 12/548,123 (54.117) filed Aug. 28, 2009, invented by Joshua Fox, Total 15 pages.
Response to Office Action, dated Mar. 29, 2017, for U.S. Appl. No. 12/548,123 (54.117) filed Aug. 26, 2009, invented by Joshua Fox, Total 11 pages.
Final Office Action. dated Jun. 20, 2017, for U.S. Appl. No. 12/548,123 (54.117) filed Aug. 26, 2009, invented by Joshua Fox, Total 17 pages.
Response to Office Action, dated Jan. 6, 2017, for U.S. Appl. No. 13/676,712 (54.118), filed Nov. 14, 2012, invented by Joshua Fox, Total 10 pages.
Final Office Action, dated Mar. 30, 2017, for U.S. Appl. No. 13/676,712 (54.118), filed Nov. 14, 2012, invented by Joshua Fox, Total 15 pages.
Response to Final Office Action, dated May 31, 2017, for U.S. Appl. No. 13/676,712 (54.118), filed Nov. 14, 2012, invented by Joshua Fox, Total 10 pages.
Notice of Allowance, dated 06/15/17, for U.S. Appl. No. 13/676,712 (54.118), filed Nov. 14, 2012, invented by Joshua Fox, Total 21 pages.
Office Action, dated Feb. 24, 2017, for U.S. Appl. No. 14/228,246 (54.118C1) filed Mar. 26, 2014, invented by Shlomit Avrahami et al., Total 8 pages.
Response to Office Action, dated May 25, 2017, for U.S. Appl. No. 14/228,246 (54.118C1) filed May 26, 2014, invented by Shlomit Avrahami et al., Total 9 pages.
Notice of Allowance, dated Jun. 16, 2017, for U.S. Appl. No. 14/228,246 (54.118C1) filed Mar. 26, 2014, invented by Shlomit Avrahami et al., Total 64 pages.
Corrected Notice of Allowability, dated Feb. 21, 2017 (Only initialed IDS) for U.S. Appl. No. 12/648,413 (54.120) filed Dec. 29, 2009, Invented by Joshua Fox, Total 14 pages.
Notice of Allowance, dated May 3, 2017, for U.S. Appl. No. 13/431,032 (54.120C1), filed Mar. 27, 2012, invented by Joshua Fox et al., Total 20 pages.
Corrected Notice of Allowability, dated Jun. 12, 2017, for U.S. Appl. No. 13/431,032 (54.120C1), filed Mar. 27, 2012, invented by Joshua Fox et al., Total 6 pages.

* cited by examiner

Search results 6 matching "billing complaint"

[Search]

Sprint PCS Billing
billing issues
I have used Sprint for the past 3 years, and have met really had many issues with their service until this past May. On May 2007, my Sprint bill reflected charges of over $600 worth of downloads from a company called FlyCell, to which I never requested or submitted a request for their services.....

DSL Billing and Technical Issues
Doing nothing but collecting revenue from its customers
I would like to file a formal complaint about billing practices against American Telephone and Telegraph. The particular account is for Internet provider service bundled to my phone service, my account number is 650-959-3844-040-3. Service contact numbers are 1-877-722-3755 for Internet and...

Correctional Billing Services
says we owe and we don't
Correctional billing contacted us to set up account, we gave them our credit card number and they deducted $106.00, we used there services for a short time, then we were done using, they called and said we had a balance owing to us of about $20.00. Later, we received bill for $13.22. Twice I....  — 302

Reliance Mobile, Billing and cust service
Pathettic Service from reliance
Hi Team,
Complaints to reliance Mobile number:9321040593
This is a complaint regarding poor cust service received from 2 advisors and 1 supervisor in customer care.
ISSUE: I wanted to set up a caller tune ...

Search results for matching "billing complaint"

Some of the search results summaries below contain sensitive information. This information might not be required for your business needs and is therefore it's masked out by the system.

Sprint PCS Billing
Billing Issues
I have used [company] for the past 3 years, and have not really had many issues with their service until this past May. On May 2007, my Sprint bill reflected charges of over $$ worth of downloads from a company called [company], to which I never requested or submitted a request for their services....

DSL Billing and Technical Issues
Doing nothing but collecting revenue from its customers
I would like to file a formal complaint about billing practices against [Company]. The particular account is for Internet provider service bundled to my phone service, my account number is [Account number]. Service contact numbers are [Phone numbers] for Internet and....

Correctional Billing Services
says we owe and we don't
Correctional billing contacted us to set up account. we gave them our credit card number and they deducted $$, we used there services for a short time, then we were done using, they called and said we had a balance owing to us of about $$. Later, we received bill for $$. Twice l...

Reliance Mobile, Billing and cust service
Pathettic Service from reliance
Hi Taam,
Complaints to reliance Mobile number: [Phone number]
This is a complaint regarding poor cust service received from 2 advisors and 1 supervisor in customer care.
ISSUE: I wanted to set up a caller tune ...

Fig. 3B

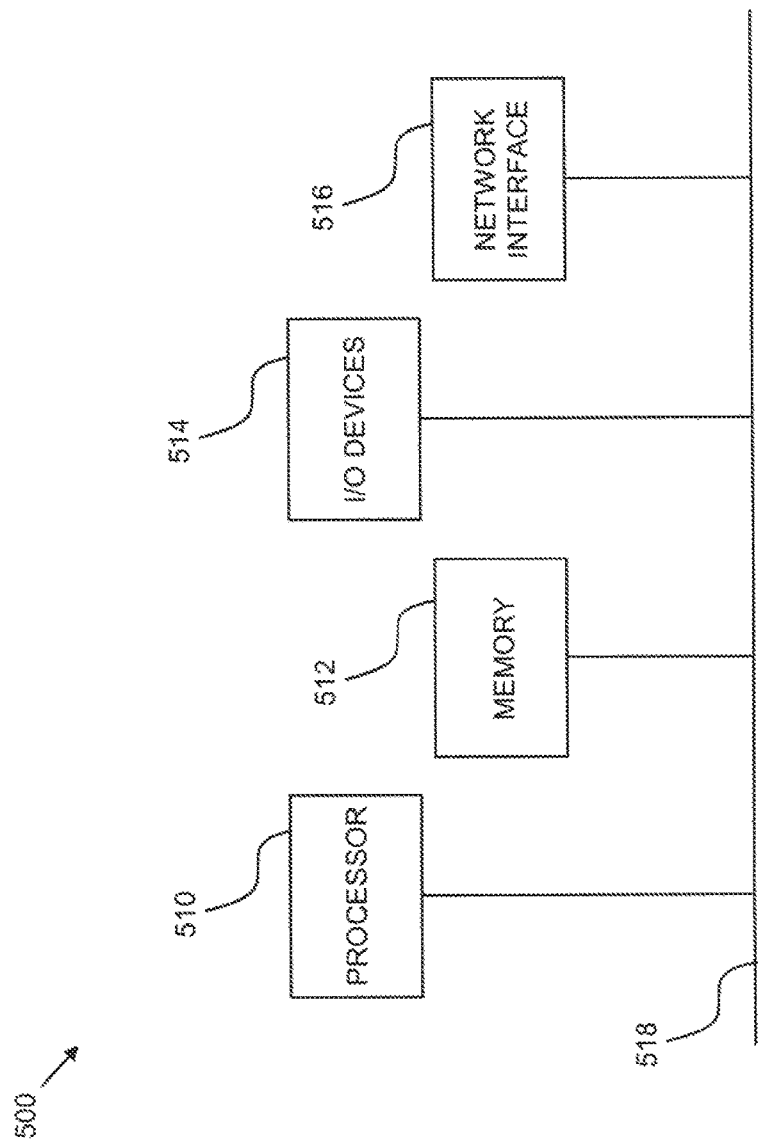

SEARCH ENGINE WITH PRIVACY PROTECTION

CROSS-REFERENCE TO RELATED APPLICATION

This application is a divisional of U.S. patent application Ser. No. 12/559,720, filed Sep. 15, 2009, which application is incorporated herein by reference in its entirety.

FIELD OF THE INVENTION

The invention relates to computer data access control and privacy in general, and more particularly in relation to search engines.

BACKGROUND OF THE INVENTION

Many companies strive to make data in one part of the company available to employees in other parts of the company to maximize the use and benefit of the data. While search engines are excellent tools for indexing company data and allowing the data to be searched, access to such data is often restricted in accordance with a predefined access control model, allowing employees to access data to which they are authorized, while preventing them from accessing data to which they are not authorized. As such, managers of company search engines must choose between excluding restricted information from the search engine index, potentially depriving employees from learning about useful company data which they may be authorized to access, or including restricted information in the search engine index, potentially exposing employees to company data, even in abbreviated form in a search result set, which they may not be authorized to access.

SUMMARY OF THE INVENTION

The invention in embodiments thereof discloses novel systems and methods for searching access-controlled documents that include restricted information and providing search results therefor.

In one aspect of the invention a search engine system with privacy protection is provided, the system including a data indexer configured to create an index of data, a search engine configured to search the index of the data in response to a query, and create a search result set including excerpts from the data, and a privacy protector configured to identify at least one data entity within at least one excerpt of the search result set that meets at least one predefined entity extraction criterion, redact the search result set by removing the data entity from the excerpt, and present the redacted search result set on a computer output device, where any of the data indexer, search engine, and privacy protector are implemented in either of computer hardware and computer software embodied in a computer-readable medium.

In another aspect of the invention the data indexer is configured to create a set of excerpts from the data independent from the processing of queries by the search engine, where the privacy protector is configured to identify at least one data entity within the set of excerpts that meets at least one predefined entity extraction criterion, and pre-redact the set of excerpts by removing from the set of excerpts the data entity identified in the set of excerpts, and where the search engine is configured to create the search result set from the pre-redacted set of excerpts in response to the query.

In another aspect of the invention the data indexer is configured to identify at least one data entity within the index that meets at least one predefined entity extraction criterion, and redact the index set by removing the data entity from the index.

In another aspect of the invention a method is provided for providing privacy protection in a search engine system, the method including searching a index of data in response to a query, creating a search result set including excerpts from the data as a result of the searching, identifying at least one data entity within at least one excerpt of the search result set, where the data entity meets at least one predefined entity extraction criterion, redacting the search result set by removing the data entity from the excerpt, and presenting the redacted search result set on a computer output device.

In another aspect of the invention the method further includes creating a set of excerpts from the data independent from the processing of queries by a search engine, identifying at least one data entity within the set of excerpts that meets at least one predefined entity extraction criterion, and pre-redacting the set of excerpts by removing from the set of excerpts the data entity identified in the set of excerpts, where the step of creating a search result set includes creating the search result set from the pre-redacted set of excerpts in response to the query.

In another aspect of the invention a system is provided for classifying data in accordance with data access reasons, the system including a predefined access reasons database having a plurality of predefined access reasons, and a data classifier configured to create a classification index of data by identifying an association between any of the data and at least one of the predefined access reasons, and storing the association in the classification index, where any of the predefined access reasons database and data classifier are implemented in either of computer hardware and computer software embodied in a computer-readable medium.

In another aspect of the invention the predefined access reasons database includes at least one predefined association between any of the predefined access reasons and at least one predefined data entity type, and where the predefined association indicates that access is permitted to any of the data that includes a data entity of the data entity type.

In another aspect of the invention the data classifier is configured to identify the association by identifying at least one data entity within any of the data, where the data entity is of any of the predefined data entity types, and associating any of the data that includes the identified data entity with the access reasons that is associated with the data entity type of the identified data entity.

In another aspect of the invention the data classifier is configured to identify the association by determining that the data matches a statistical profile of a sample data set associated with the access reason.

In another aspect of the invention the system further includes a data access request logger configured to require the selection of an access reason from the database in association with a query to be processed regarding the data, and a privacy protector configured to eliminate from a search result set resulting from the processing of the query any search result excerpt except where access to the data underlying the search result excerpt is permitted for the selected access reason as indicated by the association in the classification index between the underlying data and the selected access reason.

In another aspect of the invention the system further includes a data access request logger configured to require the selection of an access reason from the database in association with a query to be processed regarding the data, and a privacy protector configured to identify at least one data entity within at least one excerpt of a search result set resulting from the processing of the query, where the data entity meets at least one predefined entity extraction criterion, and redact the search result set by removing the data entity from the excerpt unless the data entity is of a data entity type that is associated with the selected access reason as indicated in the predefined access reasons database as permitting access to the data entity type.

In another aspect of the invention further includes a data access request logger configured to require the selection of an access reason from the predefined access reasons database if the underlying data of any excerpt in a search result set resulting from the processing of a query is associated with any access reason in classification index, and a privacy protector configured to eliminate from the search result set any search result excerpt except where access to the data underlying the search result excerpt is permitted for the selected access reason as indicated by the association in the classification index between the underlying data and the selected access reason.

In another aspect of the invention the data access request logger is configured to present for selection only those of the access reasons that are associated with the underlying data of the search result set as indicated in the classification index.

In another aspect of the invention the system further includes a privacy protector configured to identify at least one data entity within at least one excerpt of a search result set resulting from the processing of a query, where the data entity meets at least one predefined entity extraction criterion, and redact the search result set by removing the data entity from the excerpt, and a data access request logger configured to allow the selection of an access reason from the database in association with the query to be processed regarding the data, and restore the data entity that was previously removed from the excerpt of the search result set if the data entity is of a data entity type that is associated with the selected access reason as indicated in the predefined access reasons database as permitting access to the data entity type.

In another aspect of the invention a method is provided for classifying data in accordance with data access reasons, the method including providing a plurality of predefined access reasons, identifying an association between a unit of data and at least one of the predefined access reasons, and storing the association in the classification index.

In another aspect of the invention the providing step includes providing at least one predefined association between any of the predefined access reasons and at least one predefined data entity type, where the predefined association indicates that access is permitted to any of the data that includes a data entity of the data entity type.

In another aspect of the invention the identifying step includes identifying at least one data entity within any of the data, where the data entity is of any of the predefined data entity types, and associating any of the data that includes the identified data entity with the access reasons that is associated with the data entity type of the identified data entity.

In another aspect of the invention the identifying step includes determining that the data matches a statistical profile of a sample data set associated with the access reason.

In another aspect of the invention the method further includes requiring the selection of an access reason from the access reasons in association with a query to be processed regarding the data, and eliminating from a search result set resulting from the processing of the query any search result excerpt except where access to the data underlying the search result excerpt is permitted for the selected access reason as indicated by the association in the classification index between the underlying data and the selected access reason.

In another aspect of the invention the method further includes requiring the selection of an access reason from the access reasons in association with a query to be processed regarding the data, identifying at least one data entity within at least one excerpt of a search result set resulting from the processing of the query, where the data entity meets at least one predefined entity extraction criterion, and redacting the search result set by removing the data entity from the excerpt unless the data entity is of a data entity type that is associated with the selected access reason as indicated in the predefined access reasons as permitting access to the data entity type.

In another aspect of the invention the method further includes requiring the selection of an access reason from the predefined access reasons if the underlying data of any excerpt in a search result set resulting from the processing of a query is associated with any access reason in classification index, and eliminating from the search result set any search result excerpt except where access to the data underlying the search result excerpt is permitted for the selected access reason as indicated by the association in the classification index between the underlying data and the selected access reason.

In another aspect of the invention the method further includes identifying at least one data entity within at least one excerpt of a search result set resulting from the processing of a query, where the data entity meets at least one predefined entity extraction criterion, redacting the search result set by removing the data entity from the excerpt, allowing the selection of an access reason from the access reasons in association with the query to be processed regarding the data, and restore the data entity that was previously removed from the excerpt of the search result set if the data entity is of a data entity type that is associated with the selected access reason as indicated in the predefined access reasons as permitting access to the data entity type.

In another aspect of the invention a computer program product is provided for providing privacy protection in a search engine system, the computer program product including a computer readable medium, and computer program instructions operative to search a index of data in response to a query, create a search result set including excerpts from the data as a result of the searching, identify at least one data entity within at least one excerpt of the search result set, where the data entity meets at least one predefined entity extraction criterion, redact the search result set by removing the data entity from the excerpt, and present the redacted search result set on a computer output device, where the program instructions are stored on the computer readable medium.

In another aspect of the invention a computer program product is provided for classifying data in accordance with data access reasons, the computer program product including a computer readable medium, and computer program instructions operative to provide a plurality of predefined access reasons, identify an association between a unit of data and at least one of the predefined access reasons, store the association in the classification index, require the selection of an access reason from the access reasons in association with a query to be processed regarding the data, and eliminate from a search result set resulting from the processing of the query any search result excerpt except where access to the data underlying the search result excerpt is permitted for the selected access reason as indicated by the association in the classification index between the underlying data and the selected access reason, where the program instructions are stored on the computer readable medium.

BRIEF DESCRIPTION OF THE DRAWINGS

The invention will be understood and appreciated more fully from the following detailed description taken in conjunction with the appended drawings in which:

FIGS. 3A and 3B are examples of displayed data, useful in understanding the invention;

FIG. 5 is a simplified block diagram illustration of an exemplary hardware implementation of a computing system, constructed and operative in accordance with an embodiment of the invention.

DETAILED DESCRIPTION OF THE INVENTION

Figure 1:
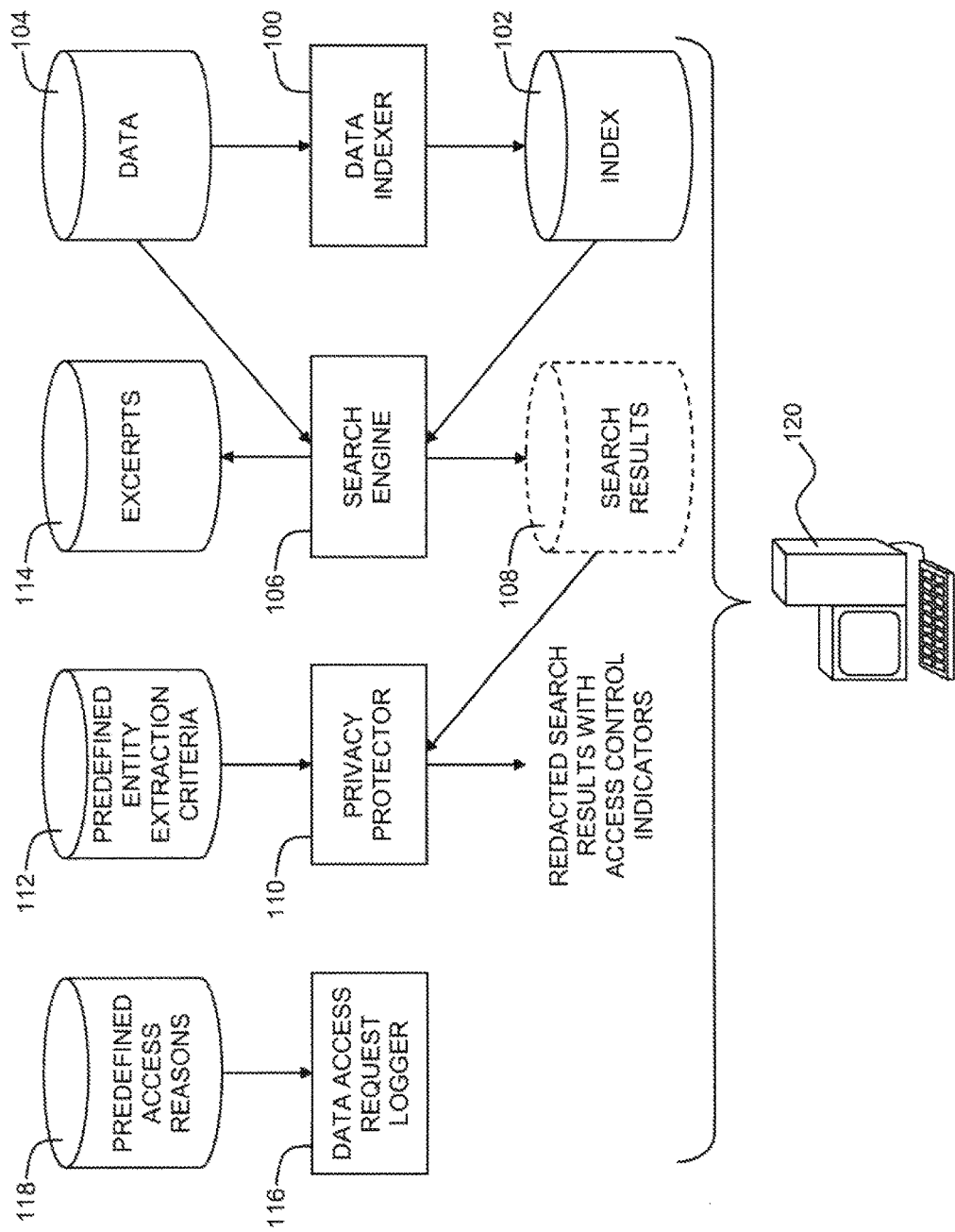
FIG. 1 is a simplified conceptual illustration of a search engine system with privacy protection, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a search engine system with privacy protection, constructed and operative in accordance with an embodiment of the invention. In the system of FIG. 1, a data indexer 100 creates an index 102 of data 104, where index 102 is created for use by a search engine 106 in accordance with conventional techniques except as otherwise described herein. Data 104 preferably includes any kind of data that are indexable into index 102 for use by search engine 106, such as database records and word processing documents. Where access to data 104 is restricted, such as where access to data 104 is controlled by an access control system (not shown), data indexer 100 is preferably given unrestricted access to data 104 or is otherwise provided with data 104, such as by a crawler (not shown) that has unrestricted access to data 104.

When search engine 106 queries data 104 in response to a query, search engine 106 creates a search result set 108 which includes excerpts from data 104 in accordance with conventional techniques. A privacy protector 110 uses conventional techniques, such as those employed by System T™ and IBM Classification Module™ (ICM), both commercially available from International Business Machines, Armonk, N.Y., to identify data entities within the excerpts in search result set 108 that meet predefined entity extraction criteria 112, where the criteria preferably indicate what types of information should be removed from the search result excerpts due to privacy considerations. Examples of such data entities include, but are not limited to, Social Security Numbers, patient names, and credit card numbers. Predefined entity extraction criteria 112 may include criteria that are applicable regardless of the persons or parties that initiated the query, and/or criteria that are specific to individual persons or parties. Privacy protector 110 then presents search result set 108, such as on a computer display or other computer output device, in a redacted format, where access to those data entities of search result set 108 that meet predefined entity extraction criteria 112 is prevented, such as by displaying the excerpts of search result set 108 without those data entities. Privacy protector 110 preferably presents one or more access control indicators in place of removed data entities indicating that access to the data entities is prevented, such as by displaying in place of the removed data entity an icon or the words "Access Restricted" or the semantic type of the deleted data.

In accordance with an alternative embodiment of the invention, data indexer 100 creates a set of excerpts 114 from data 104 in accordance with conventional techniques independent from the processing of queries by search engine 106. Privacy protector 110 then identifies data entities within excerpts 114 that meet predefined entity extraction criteria 112, preferably where the criteria are applicable regardless of the persons or parties that may initiate queries, and pre-redacts excerpts 114 by removing the identified data entities from within excerpts 114 as described above. Search engine 106 then creates search result set 108 from pre-redacted excerpts 114 in response to a query and presents search result set 108 as is, or with additional redaction as described above by applying predefined entity extraction criteria 112 that are specific the person or party that initiated the query.

In accordance with an embodiment of the invention, predefined entity extraction criteria 112 that are specific to individual persons or parties are defined in accordance with an access control model, such as a regulation-driven policy model, of entities, roles, policies, rules, actions, and obligations based on regulations and business requirements. For example, where data 104 includes medical records, predefined entity extraction criteria 112 may be defined to identify any data entities within data 104 that are to be redacted as described above for any individuals identified as having a role other than that of a physician. Thus, access to a given type of data entity or to a data entity matching a given rule may be defined as permitted or forbidden to an individual having a certain role, such as that of Physician or Chief Financial Officer.

Once search result set 108 has been presented as described above, any item in search result set 108 may be selected by a requestor, whereupon access may be given to the complete version of the item in data 104 from which the selected excerpt was taken, subject to any applicable access and/or privacy controls, such as may be provided by an underlying enterprise information system in accordance with conventional techniques. In accordance with an embodiment of the invention, a data access request logger 116 is configured such that when an item in search result set is selected, data access request logger 116 allows or requires that the request be accompanied by a reason. The reason may be manually entered or selected from a database 118 of predefined access reasons, which may be predefined at any level of access control, such as for a specific user, role, data item, etc., and which may also indicate whether or not to grant access to requested data, subject to any applicable access controls. Data access request logger 116 is preferably configured to maintain a record of the identity of the requestor together with a description of the requested data item and the reason given for the request, if given, and may also include additional information such as the role of the requester and the time of the request. Such information may be later analyzed to determine whether the request was justified, whether disciplinary action should be taken, and/or whether any of the data access model entities, permissions, or reasons described above should be modified to further restrict access to data and/or relax existing restrictions.

In the embodiments above index 102 is constructed from data 104 without restriction and is itself allowed to contain data that are removed from search result excerpts as described hereinabove. Alternatively, index 102 is constructed such that it does not itself contain data that are defined, using any conventional technique, as private data. Thus, in this alternative embodiment, index 102 would not, for example, contain patient names or identification numbers.

Figure 2:
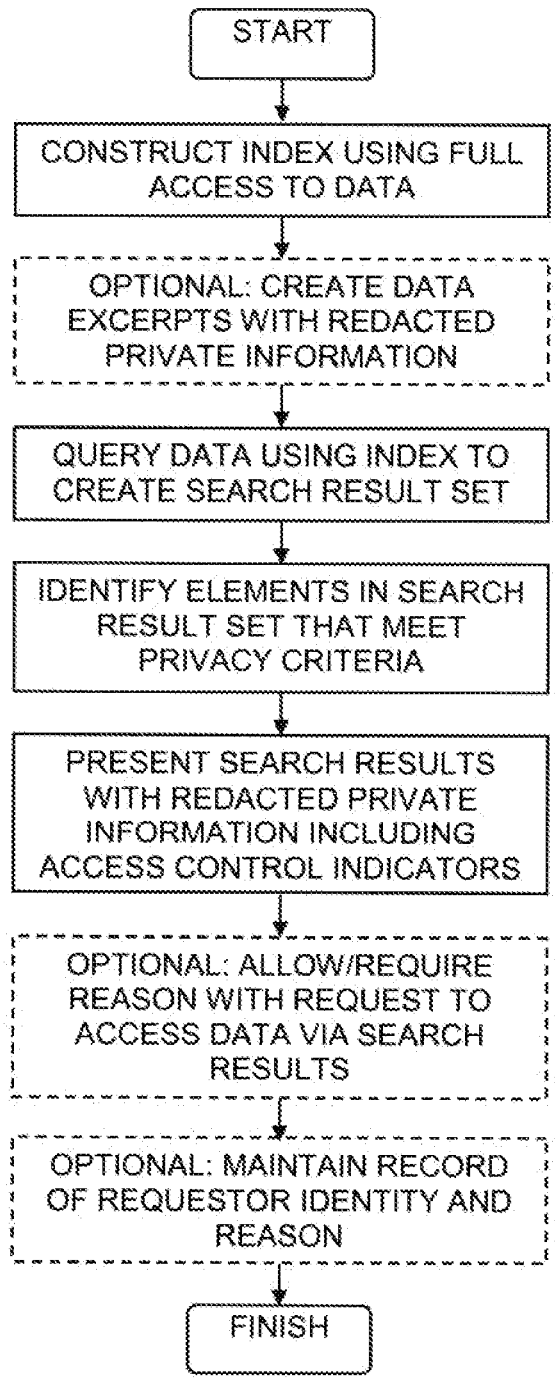
FIG. 2 is a simplified flowchart illustration of an exemplary method of operation of the system of FIG. 1, operative in accordance with embodiments of the invention.

Reference is now made to FIG. 2, which is a simplified flowchart illustration of an exemplary method of operation of the system of FIG. 1, operative in accordance with an embodiment of the invention. In the method of FIG. 2, an index of data is created for use by a search engine, preferably when full access to the data is provided. Optionally, a set of excerpts from data is created from which data entities are removed that meet predefined entity extraction criteria. When, in response to a query, a search engine queries the data using the index, a search result set is created of excerpts from the data and/or from the previously-created set of excerpts. Data entities within the search results set are identified that meet predefined entity extraction criteria. The search results are then presented in a redacted format, where access to those data entities of the search result set that meet the predefined entity extraction criteria is prevented by removing the data entities. Access control indicators may be presented in place of removed data entities indicating that access to the data entities is prevented. Any item in the search result set may be selected by a requestor, whereupon access may be given to the complete version of the item in data from which the selected excerpt was taken, subject to any applicable access controls. Optionally, when an item in the search result set is selected, the request may be or must be accompanied by a reason. The reason may be manually entered or selected from a database of predefined reasons. Optionally, a record of the identity of the requestor is maintained together with a description of the requested data item, the reason given for the request, if given, and/or additional information such as the role of the requester and the time of the request.

The system and method of FIGS. 1 and 2 may also be understood by way of example as shown in FIGS. 3A-3B as follows. In FIG. 3A a set 300 of search engine search results are shown as they would appear on a computer display without being redacted in accordance with privacy criteria as described hereinabove. Thus, in the example shown, company names, account numbers, financial data, and other sensitive information are presented, as indicated by outlined regions 302. In FIG. 3B a set 300' of the same search results are shown as they would appear on a computer display after being redacted in accordance with privacy criteria as described hereinabove. Thus, in the example shown, company names, account numbers, financial data, and other sensitive information are removed and replaced with access control indicators 302'. A warning message 304 may also be displayed indicating that the search results have been redacted due to privacy considerations.

In addition to, or as an alternative to, removing data from search result excerpts due to privacy considerations as described hereinabove, documents may be classified based on the types of data that they contain and access reasons that permit or restrict access to such data. These classifications may then be used in conjunction with search engine queries as is now described hereinbelow.

Figure 4A:
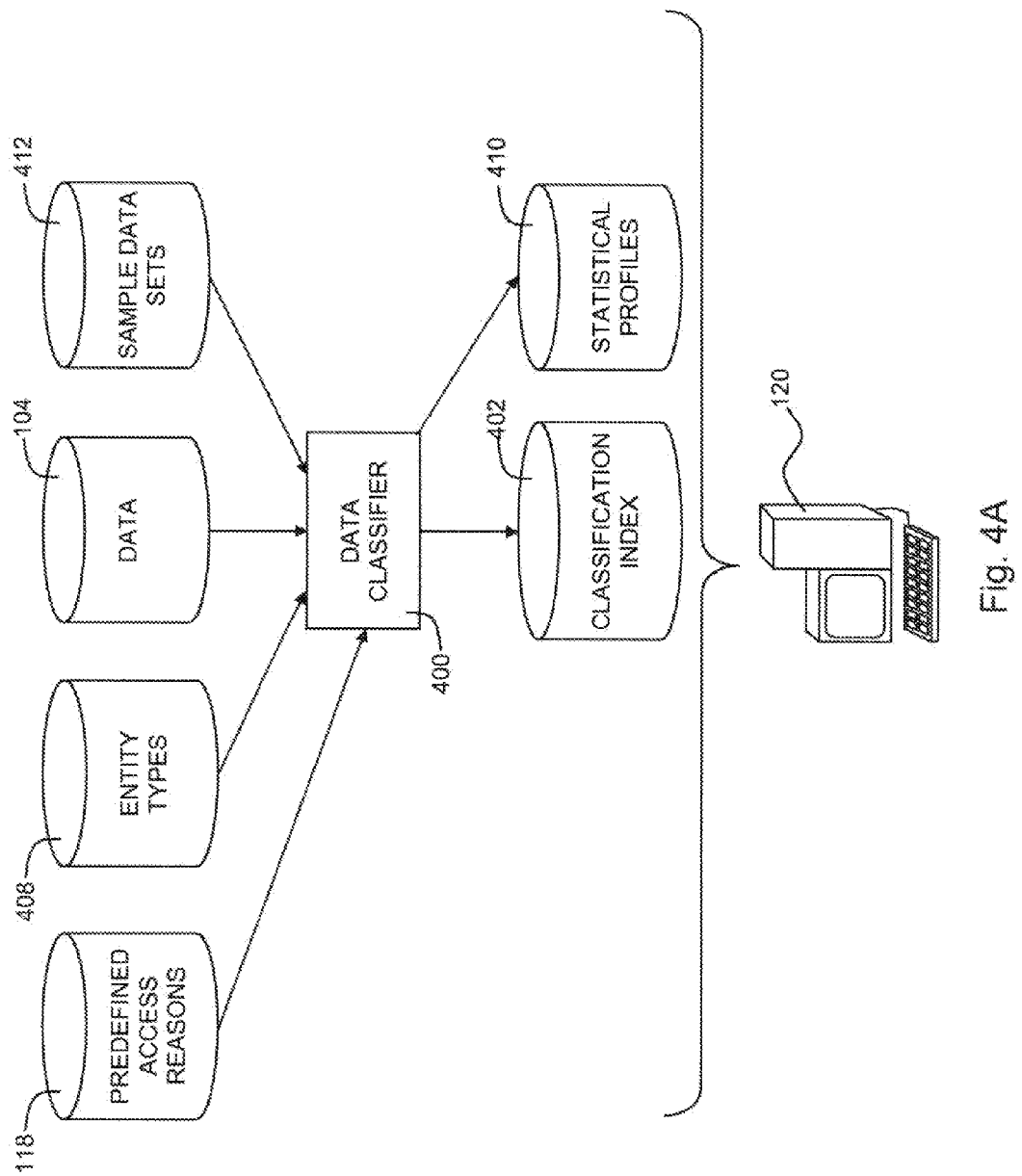
FIG. 4A is a simplified conceptual illustration of a system for classifying data in accordance with data access reasons, constructed and operative in accordance with an embodiment of the invention.

Reference is now made to FIG. 4A, which is a simplified conceptual illustration of a system for classifying data in accordance with data access reasons, constructed and operative in accordance with an embodiment of the invention, and additionally to FIGS. 4B-4E, which are simplified flowchart illustrations of exemplary methods of operation of the system of FIG. 4A, operative in accordance with embodiments of the invention. In the system of FIG. 4A, a data classifier 400 creates a classification index 402 of data 104. Data 104 preferably includes any kind of data that are indexable and searchable as described hereinabove with reference to FIGS. 1 and 2. Where access to data 104 is restricted, such as where access to data 104 is controlled by an access control system (not shown), data classifier 400 is preferably given unrestricted access to data 104 or is otherwise provided with data 104, such as by a crawler (not shown) that has unrestricted access to data 104.

Data classifier 400 preferably employs predefined access reasons database 118 (FIG. 1) and constructs classification index 402 by determining which predefined access reasons in database 118 are associated with which portions (e.g., documents, data sets) of data 104 and storing the associations in classification index 402. In one embodiment, database 118 includes predefined associations between the access reasons in database 118 and predefined data entity types in a set 408, where an association between an access reason and a data entity type indicates that access is permitted to data that includes data entities of that data entity type. For example, predefined access reasons for accessing patient records may include "treating the patient," "reviewing the record for quality control," and "authorized use of patient history for statistical research." The "social security number" data entity type may be associated with "treating the patient" to allow access to data that includes social security numbers. Data classifier 400 performs data entity extraction using conventional techniques, such as those employed by System T™, to identify data entities within data 104 that match the predefined data entity types in database 118, whereupon data classifier 400 associates portions of data 104 that include data entities identified in this manner with the access reasons that are associated with their data entity types.

In another embodiment, data classifier 400 employs text classification techniques, such as those employed by the IBM Classification Module™ (ICM), to build statistical profiles 410 of sample data sets 412, where for each predefined access reason in database 118 one manually categorized sample data set 412 is provided as an example of data to which access is permitted for the access reason, and/or another manually categorized sample data set 412 is provided as an example of data to which access is not permitted for the access reason. Data classifier 400 then constructs classification index 402 by determining which portions (e.g., documents, data sets) of data 104 match the statistical profiles 410 of which predefined access reasons in database 118 and stores the associations in classification index 402.

Figure 4B:
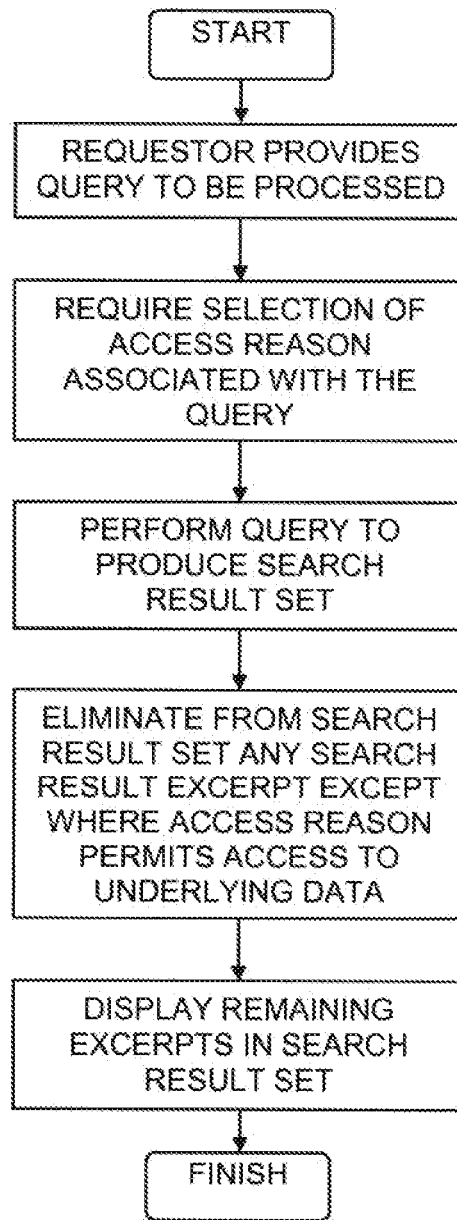
FIGS. 4B-4E, which are simplified flowchart illustrations of exemplary methods of operation of the system of FIG. 4A, operative in accordance with embodiments of the invention.

The system of FIG. 4A is used in conjunction with elements of the system of FIG. 1 as follows. In one embodiment, as shown in FIG. 4B, when a requestor wishes to perform a query on data 104 using search engine 106, data access request logger 116 requires that the requestor select an access reason from database 118 that is to be associated with the query, where the list of access reasons may be tailored for the requestor based on predefined relationships between access reasons and user roles and other characteristics. Search engine 106 performs the query on data 104 to produce search result set 108. Privacy protector 110 eliminates from search result set 108 any search result excerpt except where access to the data 104 underlying the search result is permitted for the selected access reason as indicated by an association in classification index 402 between the underlying data 104 and the selected access reason. The remaining excerpts in search result set 108 are then displayed.

Figure 4C:
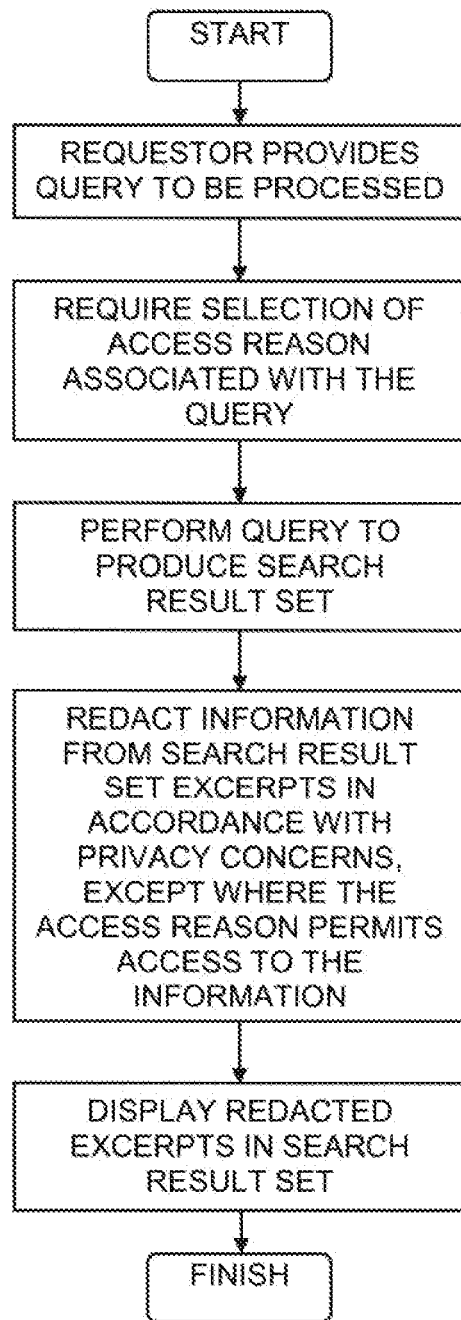

In another embodiment, as shown in FIG. 4C, when a requestor wishes to perform a query on data 104 using search engine 106, data access request logger 116 requires that the requestor select an access reason from database 118 that is to be associated with the query. Search engine 106 performs the query on data 104 to produce search result set 108. Privacy protector 110 removes information from the excerpts of search result set 108 in accordance with privacy concerns as described hereinabove with reference to FIG. 1, with the exception of any data entities whose data entity type is associated with the selected access reason as indicated in database 118, where the association indicates that access to the data entity type for the selected access reason is permitted. The redacted excerpts in search result set 108 are then displayed.

Figure 4D:
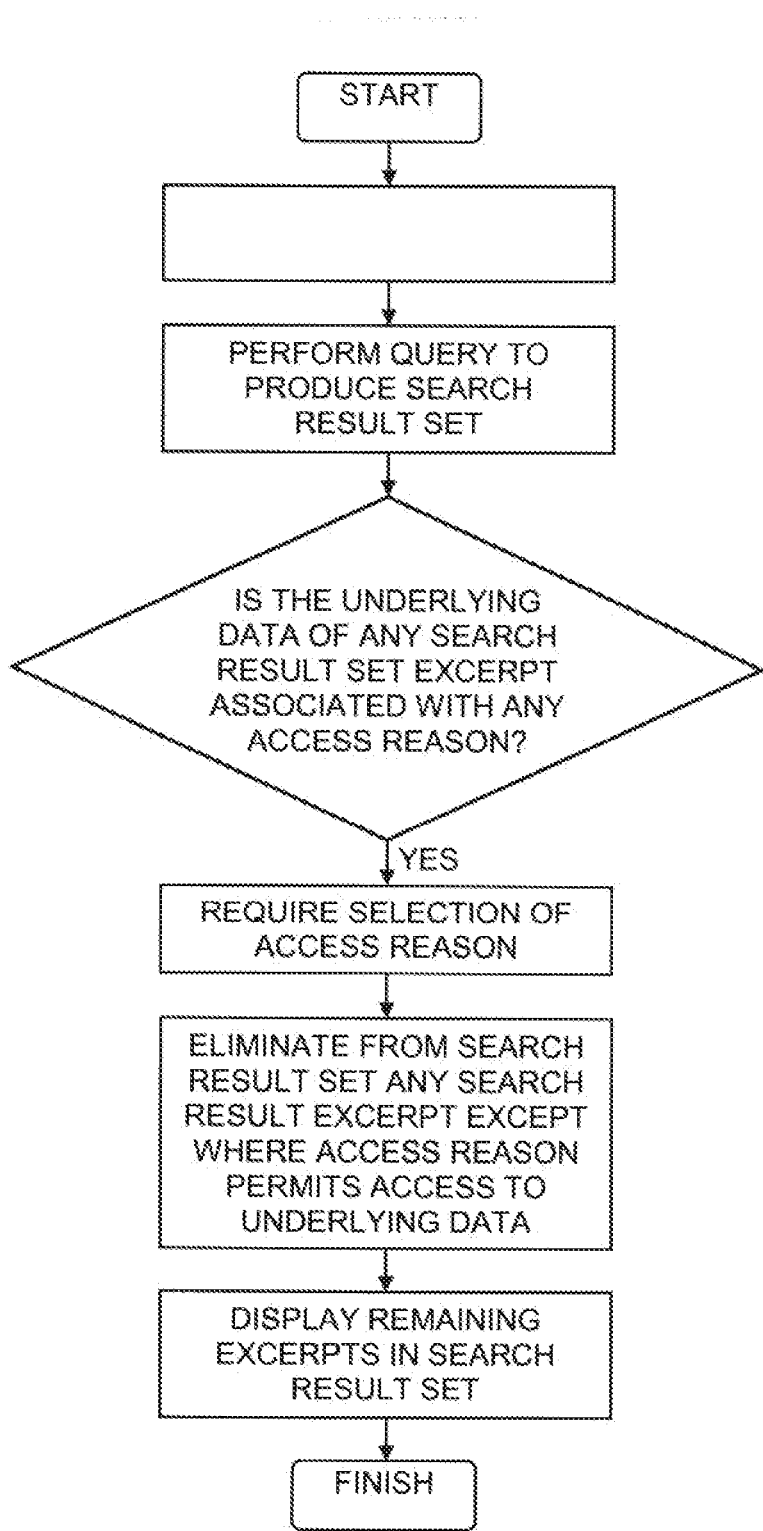

In yet another embodiment, as shown in FIG. 4D, when a requestor wishes to perform a query on data 104 using search engine 106, data access request logger 116 does not require that the requestor select an access reason from database 118 that is to be associated with the query. Search engine 106 performs the query on data 104 to produce search result set 108. Prior to displaying any of the results in search result set 108, if the underlying data 104 of any excerpt in search result set 108 is associated with any access reason in classification index 402, data access request logger 116 requires that the requestor select an access reason from database 118, preferably where the list of access reasons presented to the requestor includes only those access reasons that are associated with the underlying data 104 of search result set 108 as indicated in classification index 402. Privacy protector 110 eliminates from search result set 108 any search result excerpt except where access to the data 104 underlying the search result is permitted for the selected access reason as indicated in classification index 402. The remaining excerpts in search result set 108 are then displayed.

Figure 4E:
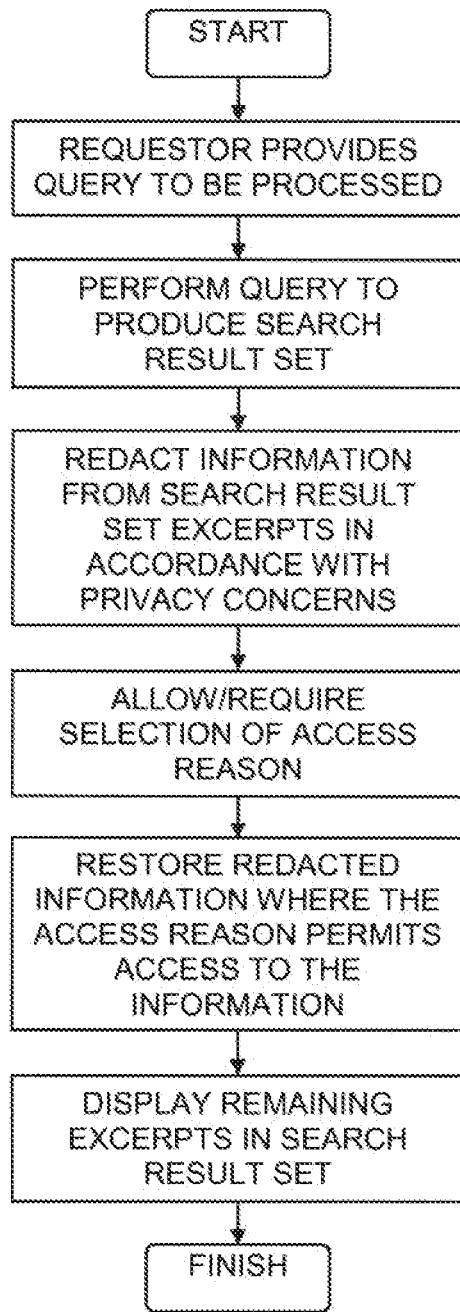

In still another embodiment, as shown in FIG. 4E, when a requestor wishes to perform a query on data 104 using search engine 106, data access request logger 116 does not require that the requestor select an access reason from database 118 that is to be associated with the query. Search engine 106 performs the query on data 104 to produce search result set 108. Privacy protector 110 removes information from the excerpts of search result set 108 in accordance with privacy concerns as described hereinabove with reference to FIG. 1, and the redacted search results are displayed. Data access request logger 116 then allows or requires that the requestor select an access reason from database 118, preferably where the list of access reasons presented to the requestor includes only those access reasons that are associated with the underlying data 104 of search result set 108 as indicated in classification index 402. If an access reason is provided, privacy protector 110 restores any information previously removed from any excerpt of search result set 108 of any data entities whose data entity type is associated with the selected access reason as indicated in database 118, where the association indicates that access to the data entity type for the selected access reason is permitted. The search results are then redisplayed with the restored information.

In any of the embodiments of FIGS. 4B-4E, once search result set 108 has been presented as described above, any item in search result set 108 may be selected by a requestor, whereupon access may be given to the complete version of the item in data 104 from which the selected excerpt was taken, subject to any applicable access and/or privacy controls, such as may be provided by an underlying enterprise information system in accordance with conventional techniques.

Any of the elements shown in FIGS. 1, 2, and 4A-4E are preferably executed by or otherwise made accessible to computer 120 (FIG. 1), such as by implementing any of the elements shown in FIGS. 1, 2, and 4A-4E in computer hardware and/or in computer software embodied in a computer-readable medium in accordance with conventional techniques.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for providing privacy protection in a data searching system, the method comprising:
   receiving a query from a requestor;
   identifying within data excerpts a first data entity;
   generating first redacted excerpts by removing the first data entity responsive to a first entity extraction criterion from the data excerpts, wherein the first entity extraction criterion is related to privacy consideration independent of an identity of the requestor;
   generating a first redacted search result set from the first redacted excerpts in response to a search query of the data occurring after the generating of the first redacted excerpts;
   identifying within the first redacted search result set a second data entity;

generating a second redacted search result set by removing the second data entity from the first redacted search result set responsive to a second entity extraction criterion, wherein the second entity extraction criterion applies rules specific to the identity the requestor; and presenting the second redacted search result set on a computer output device.

2. A data searching system comprising:

at least one processor and a memory with instructions stored therein configured for execution by the processor, wherein executing the instructions causes the at least one processor to perform actions including:

receiving a query from a requestor;

identifying within data excerpts in a search result set from the query a first data entity;

generating first redacted excerpts by removing the first data entity responsive to a first entity extraction criterion from the data excerpts, wherein the first entity extraction criterion is related to privacy consideration independent of an identity of the requestor;

generating a first redacted search result set from the first redacted excerpts in response to a search query of the data occurring after the generating of the first redacted excerpts;

identifying within the first redacted search result set a second data entity;

generating a second redacted search result set by removing the second data entity from the first redacted search result set responsive to a second entity extraction criterion, wherein the second entity extraction criterion applies rules specific to the identity the requestor; and presenting the second redacted search result set on a computer output device.

3. A computer program product comprising a non-transitory computer readable storage medium having instructions stored thereon that when executed by a processor performs operations for searching data, the operations comprising:

receiving a query from a requestor;

identifying within data excerpts in a search result set from the query a first data entity;

generating first redacted excerpts by removing the first data entity responsive to a first entity extraction criterion from the data excerpts, wherein the first entity extraction criterion is related to privacy consideration independent of an identity of the requestor;

generating a first redacted search result set from the first redacted excerpts in response to a search query of the data occurring after the generating of the first redacted excerpts;

identifying within the first redacted search result set a second data entity;

generating a second redacted search result set by removing the second data entity from the first redacted search result set responsive to a second entity extraction criterion, wherein the second entity extraction criterion applies rules specific to the identity the requestor; and presenting the second redacted search result set on a computer output device.

* * * * *